Patented July 12, 1949

2,475,965

UNITED STATES PATENT OFFICE 2,475,965

PROCESS OF PREPARING A COPPER CATALYST

David C. Hull, Oak Ridge, and Jonathan Fred Quarles, Kingsport, Tenn., assignors to Eastman Kodak Company, Rochester, N. Y., a corporation of New Jersey No Drawing. Application March 2, 1945, Serial No. 580,724

2 Claims. (Cl. 75—22)

This invention relates to the preparation of improved copper and copper base catalysts adapted for use in the oxidation and dehydrogenation of alcohols and more particularly to a process for preparing such catalysts to give them improved physical properties and high catalytic activity.

As is well known, copper or copper base catalysts have been extensively used for oxidizing or dehydrogenating alcohols to aldehydes and ketones by passing the alcohols, with or without admixture of air or oxygen-containing gases, over the catalytic mass maintained at a suitable temperature. The catalysts of this type previously employed have proved objectionable for a number of reasons, among which may be mentioned (a) variable and low catalytic activity, (b) lack of physical stability, (c) costly preparation, (d) excessive decomposition to undesirable products and (e) difficulty in reactivation. These disadvantages stem from the fact that there has not heretofore been available a wholly satisfactory method of preparing copper or copper base catalysts, all of the known methods suffering certain serious drawbacks. For example, most copper and copper base catalysts are prepared by one of the following methods having the indicated disadvantages.

(1) Cupric oxide powder is heated to 1100° C. in a reverberatory furnace until all of the cupric oxide is decomposed to cuprous oxide, after which the mass is cooled and broken up into lumps. During this method of preparation, there is a complete loss of ½ molecule of oxygen. As the oxygen is evolved and the mass cooled, the evolution of oxygen is supposed to render the catalyst very porous and active. The results actually obtained, on the contrary, are a catalyst that is crystalline in structure, full of void spaces and a low and limited activity.

(2) Cupric oxide powder is heated to 1140–1160° C. by gas flames impinging directly on the powder until it has decomposed to cuprous oxide and the mass has become a liquid. The liquid cuprous oxide is then streamed into water and quenched, giving cuprous oxide particles or shot. The resulting catalyst, like the catalyst prepared in accordance with the procedure of the preceding paragraph is crystalline in structure, full of void spaces and has low and limited catalytic activity.

(3) Pure copper metal is heated to a sufficiently high temperature to render it molten and is then blown with air or oxygen until the copper is presumably converted to cuprous oxide. The molten mass is then either streamed into water and quenched as shot or is allowed to cool and may then be broken up into lumps for use. The material prepared in this manner contains very minute particles of unoxidized copper mixed with the cuprous oxide and suffers the disadvantage that the catalyst activity is even lower and more limited than that of the previously-mentioned types.

(4) Certain copper salts, such as copper formate, copper carbonate, copper nitrate or any of the copper salts that are easily decomposed are deposited from solution on some inert material such as silica gel, carborundum or alumina and then heated to a sufficient temperature to decompose the copper salt to the oxide. Catalysts prepared by this method thus have supports that are non-heat conducting and, as a result, the temperature of the catalyst bed formed therefrom is hard to control. Because of inability to control the temperature of the catalyst bed, a very high percentage of the desired products are decomposed. Furthermore, the catalysts prepared by this method are poorly anchored to their supports with the result that during handling and use the copper particles are loosened and blown out through the system and lost.

(5) Brass turnings are coated with a paste composed of a mixture of zinc oxide and magnesium oxide and then roasted in order to convert the paste into a hard crust for use as a catalyst. Catalysts produced by this method are also poorly anchored to their supports with the result that during the handling and use of the material the zinc oxide, magnesium oxide or other added materials are loosened from their supports, blown out through the system and lost. Not only is there a loss in catalyst, but a limit is also imposed on production because of the high vapor and gas velocities through the catalytic material. This defect is also characteristic of catalysts prepared in accordance with paragraph (4).

This invention has as an object to provide copper catalysts and also copper base catalysts containing zinc, nickel and other metals, such catalysts being characterized by exceptional physical properties, high catalytic activity, ready regenerability and long life. A further object is to provide copper catalysts in which the copper is in molecular form, that is, a form in which it is porous with respect to the penetration of gases and vapors, but nevertheless is set together or compacted in hard lumps. A still further object is to provide a non-crystalline, non-dusting type of copper or copper base catalyst. Another object is to provide a process of preparing copper and copper base catalysts which is simple and economical to operate, easy to control and results in the production of catalyst masses having superior physical properties, high catalytic activity, ready regenerability and long life. Other objects will appear hereinafter.

These and other objects are accomplished by the following invention which, in its broader aspects, comprises the consolidation of a mass of cupric oxide particles, with or without the admixture of other substances which may act as supports or promoters, under the influence of heavy pressure and relatively high temperature. We have found that the above-mentioned disadvantages inherent in copper and copper base catalysts prepared in accordance with prior art methods may be entirely avoided and a catalytic mass of excellent physical properties, unexpectedly high catalytic activity, ready regenerability and long life may be prepared by employing as the starting material powdered or finely divided cupric oxide, plus whatever other metallic oxide or oxides it may be desired to employ as promoters, consolidating this material in the form of compact pellets in which the particles of copper oxide and other oxides, if the latter are present, are cohesively united by an autogenous bond by means of heavy pressure and then heating the pressed material to a temperature, preferably below the decomposition point of cupric oxide, but in any event below the melting point of cuprous oxide. To express it in slightly different terms, we first cause the cupric oxide particles to adhere under pressure and then raise them to their sintering temperature, that is, a temperature at which the material can be caused to flow under pressure, but a temperature below that at which the copper oxide will actually melt or flow of its own weight. Alternatively we may heat and press the catalytic material simultaneously.

While we do not confine ourselves to any particular theory to explain the increased catalytic activities and other unusual physical and chemical properties of our copper or copper base catalysts, we believe these improved properties can be attributed to two principal factors. First is the fact that we employ as the starting material an oxide having the maximum amount or ratio of oxygen with respect to copper, thus (on reduction by hydrogen or under the normal conditions of use as a dehydrogenating catalyst) giving the maximum amount of effective catalytic surface area. The second factor is that we employ heavy pressures and temperatures such that the particles of catalytic material actually sinter and thus are consolidated without, however, undergoing actual fusion which would reduce the effective catalytic surface area. When the pressed and sintered mass thus produced is reduced, the resulting catalyst is hard, compact, strong and self-sustaining but is nevertheless of an open and porous character with respect to the passage therethrough of gases and vapors. This is because the copper material is left in molecular form or condition, but has not been solidified into a dense, impervious or impenetrable metallic mass, as would be the case were the material or metallic oxide permitted to reach a molten condition.

We should at this point call attention to the fact that there is very great difference between sintering and actual fusion. The term "sinter" means to cause to form a solid mass under the influence of heat. While the material in this condition is in a fluid state and may be caused to flow under the influence of pressure, it is not, however, in an actual state of fusion in which it would flow under its own weight. The condition of the catalyst material of our invention in the sintering step as described above may be compared to the condition of steel undergoing a forging operation. In forging the steel is heated to a point where it will flow readily when pressure is applied, but it is still not up to its actual fusion temperature. Substantially the same situation prevails when the heavily pressed copper oxide is heated to its sintering temperature which, in the instant case, is of the order of 1000° to 1010° C.

In the following examples and description we have set forth several of the preferred embodiments of our invention but they are included merely for purposes of illustration and not as a limitation thereof.

*Example 1*

Dry cupric oxide powder is placed in a number of metal dies 1/4 inch in diameter by 5/16 inch thick and subjected to a pressure of approximately 5,000 pounds per square inch. The resulting cupric oxide pellets are then taken from the dies and roasted in an electric furnace at a temperature of 1,000–1,010° C. for 2–3 hours. Upon cooling to room temperature the pellets are found to be extremely hard, resistant to crumbling and show no tendency towards dusting. The pellets are then reduced with ethyl alcohol at 235–250° C. The resulting catalyst has an extremely high activity as indicated by the fact that when a mixture of 62.3% by volume of 92% ethyl alcohol and 37.7% by volume of air was passed over the catalyst at a temperature of 450–475° C., a conversion of 40% per single pass was obtained over a period of 28–30 days, giving a 99% yield of acetaldehyde.

*Example 2*

A mixture containing 99 parts by weight dry cupric oxide powder and 1 part by weight dry nickel oxide powder was ball-milled for 2–3 hours and then placed in metal dies of the same dimensions as those employed in Example 1 and subjected to a pressure of approximately 5000 pounds per square inch. The resulting pellets were removed from the dies, roasted in an electric furnace at 1000–1010° C. for 2–3 hours and cooled to room temperature. The pellets were found to have the same physical properties as the catalyst prepared in accordance with Example 1. After reduction of this catalyst with a vapor mixture containing 80% by weight butyl alcohol and 20% by weight water at 235–250° C., it was found to possess excellent catalytic activity, giving conversions of butyl alcohol to butyraldehyde of 35–40% when a mixture containing 80% by weight alcohol and 20% water vapor were passed through the catalytic mass at a temperature of 350–450° C.

*Example 3*

Dry cupric oxide powder is placed in heat-resisting stainless steel pans having dimensions of 10″ x 6″ x 3″ and subjected to a pressure of 1500–2000 pounds per square inch. The pans and contents are placed in an electric furnace and the temperature raised to 1000–1010° C. They are soaked at this temperature for 2–2½ hours, after which the temperature is raised to 1050–1060° C. and the material allowed to remain at that temperature for 30–35 minutes.

The pans and contents are then taken from the furnace and the resulting cupric oxide-cuprous oxide mixture subjected to a pressure of 1500–2000 pounds per square inch. While under this high pressure, they are allowed to cool to approximately 800° C. The pans and their contents are then taken from the press and when they have cooled sufficiently to permit handling, the hard cakes of the resulting cupric oxide-cuprous oxide material are knocked from the pans and broken up by a small crusher into lumps approximately 3/16" to 1/2" in size. All the dust and fine particles of the material are graded out and saved for repressing and resintering. Because of the hard, consolidated character of the catalytic material the loss of powdered material through the various steps from the original oxide to the finished catalyst is very low, and recovery of materials ranges anywhere from 98 to 99.5%.

The catalyst material prepared as just described is reduced with ethyl alcohol at 235–250° C. to produce the ultimate catalytic mass. When a mixture containing 37.7% by volume of air and 62.3% by volume of 92% ethyl alcohol vapor is passed over the catalyst at a temperature of 450–475° C., a 35% conversion of the alcohol to acetaldehyde per single pass takes place over a period of 28–30 days, giving 95% yields of acetaldehyde.

*Example 4*

A mixture containing 99% by weight dry cupric oxide powder and 1% by weight dry nickel oxide powder are ball-milled for 2–3 hours and is then placed in heat-resisting, stainless steel pans 10" x 6" x 3" and the material subjected to a pressure of 1500–2000 pounds per square inch. The pans and contents are placed in an electric furnace and the temperature raised to 1000–1010° C. and soaked at this temperature for 2½ hours. The temperature is then raised to 1050–1060° C. and allowed to remain at that value for 30–50 minutes. The pans and contents are then taken from the furnace and the resulting mixture of cupric oxide, cuprous oxide and nickel oxide is again subjected to a pressure of 1500–2000 pounds per square inch. While at this pressure the material is allowed to cool to approximately 800° C. After the pans and their contents are removed from the press and have cooled enough to handle, the hard cakes are knocked from the pans and broken into lumps 1/16 to 1/2 inch in size by a small crusher, and all the dust and fine particles of the catalyst are graded out for mixing back, repressing and recooking.

The catalyst resulting from this procedure is a hard, compact mass. The material may be reduced by passing a vapor mixture containing 80% butyl alcohol and 20% water therethrough at a temperature of 235–250° C. When the reduced catalyst is employed for the oxidation of butyl alcohol by passing a mixture containing 31.5% by volume of butyl alcohol, 31.5% water and 37% air through the catalyst at a temperature of 350–450° C., 35–40% conversions to butyraldehyde per single pass is obtained over a period of 28–30 days, with excellent yields of butyraldehyde.

*Example 5*

A mixture containing 70% by weight dry cupric oxide and 30% dry zinc oxide are ball-milled for 2–3 hours and then placed in heat-resisting steel pans 10" x 6" x 3" and the material subjected to a pressure of 1500–2000 pounds per square inch. The pans and contents are then placed in an electric furnace, and the temperature raised to 1000–1010° C. The pans are soaked at this temperature for 2–2½ hours, after which time the temperature is raised to 1050–1060° C. and allowed to remain at that value for 30–35 minutes. The pans and contents are then taken from the furnace and the resulting mixture of cupric oxide, cuprous oxide and zinc oxide is subjected to a pressure of 1500–2000 pounds per square inch. The material still under this high pressure is allowed to cool to approximately 800° C. The pans and their contents are taken from the press and when they have cooled enough to handle, the hard cakes are knocked from the pans and broken into lumps 1/16 to 1/2 inch in size. All the dust and fine particles are graded out, mixed back, repressed and recooked.

The catalyst is a hard, compact mass. It is reduced by heating to a temperature of 245–330° C., then passing ethyl alcohol vapors over it. When employed for the oxidation of ethyl alcohol to acetaldehyde, conversions of 30–40% per single pass are obtained, with excellent yields of acetaldehyde. Similarly, when the catalyst was employed for the oxidation of iso-propyl alcohol by passing a mixture containing 87.3% by weight iso-propyl alcohol and 12.7% water through the catalyst, conversions of 84–94% of the iso-propyl alcohol to acetone were obtained per single pass over a period of 204 hours, with yields of acetone running over 99%.

*Example 6*

A mixture containing 70 parts by weight copper oxide, 29 parts by weight zinc oxide and 1 part by weight nickel oxide is ball-milled for 3–5 hours, then placed in pans and pressed in hydraulic press at a pressure of 3100–3200 pounds per square inch. The pans and contents are placed in an electric furnace and heated at 1000 to 1050° C. for 1–2 hours. The pans and contents are removed from the furnace at 1050° C., and pressed again as quickly as possible at 3100–3200 pounds per square inch pressure and allowed to cool. The catalyst is then knocked from the pans with a hammer, broken in 2" pieces and crushed in a power crusher. The catalyst is then graded on approximately 1/2", 3/8", 1/4" and 1/8" screens. Pieces which do not pass 1/2" openings are recrushed and all the fine pieces that pass at 1/8" screen were reworked with fresh catalyst.

The catalyst prepared as described above is a hard, compact mass and may be reduced by heating to temperature of 235–250° C. and passing a mixture containing 87.3% by weight iso-propyl alcohol and 12.7% by weight water therethrough while heating the catalyst bed externally to a temperature of 255–265° C. Conversions of 85–95% of the iso-propyl alcohol to acetone can thus be obtained per single pass. Recovery of materials in the process is 99%.

*Example 7*

Catalyst prepared in the same manner as that in Example 6 is used for straight dehydrogenation of ethyl alcohol. The catalyst is reduced by preheating a mixture of 92% by weight ethyl alcohol and 8% by weight water to 235–250° C. and passing the mixture over the catalyst bed. After reduction, the temperature of the catalyst bed is maintained at 450–475° C. by external heating, and a conversion of 30–40% of ethyl alcohol to acetaldehyde is obtained per single pass.

Example 8

A mixture of 30% zinc oxide and 70% copper oxide is ball-milled over night and the powdered catalyst placed in one inch Berl saddle dies and subjected to a pressure of 900–1200 pounds per square inch. The mixture is then heated in a muffle furnace for 30 minutes at temperature of 1050–1100° C. Upon cooling the catalyst may be employed as follows:

A mixture of 88.16% by weight iso-propyl alcohol and 11.84% by weight water is passed over a catalyst bed composed of the copper oxide-zinc oxide Berl saddles, at a temperature of 250–255° C. A conversion of 75% of iso-propyl alcohol to acetone is obtained per pass, with a yield of 99%. This is a slightly lower conversion per pass than is obtained by use of the pellet type catalyst, but the Berl saddle type catalyst has the advantage that a very high conversion per unit weight of catalyst results.

Example 9

A mixture of 92% by weight ethyl alcohol and 8% by weight water is passed through a catalyst bed composed of copper oxide-zinc oxide Berl saddles prepared as described in Example 8 and heated to a temperature of 450–475° C. A conversion of 30–35% ethyl alcohol to acetaldehyde is obtained. Conversion in this case is also lower than would be obtained using the pellet type catalyst, but, on the other hand, is very high per unit weight of catalyst.

While we have chosen to illustrate the production of our improved catalysts by reference to certain specific procedures and the use of certain specific compositions, it will be evident that many modifications in both procedure and the compositions employed can be made within the scope of our invention.

For example, while we have referred to the use of pressures of the order of 1000 to 5000 pounds per square inch for compressing the particles of copper oxide into a unitary mass, we may under some circumstances employ pressures lower than 1000, such as 500 pounds per square inch, or pressures in excess of 5000 pounds.

Likewise, although the temperature employed for consolidation of the pressed mass may be varied from 500° C. to just below 1235° C. the preferred range is 1000–1010° C. However, in general and in accordance with the principles herein set forth, the temperature should not reach the melting point of cuprous oxide (1235° C.) since it is one of the features of our invention that the catalyst material is not permitted to melt and run together, that is, flow of its own weight, as is the case in the production of copper catalysts by prior art procedures in which the material in metallic or oxide form is actually melted and then quenched in water. While in certain instances, as illustrated by the above examples, we may employ temperatures above the decomposition point of cupric oxide (1026° C.), that is, temperatures at which the original cupric oxide is at least partially decomposed to cuprous oxide, the temperature should never be permitted to reach that at which cuprous oxide is melted. In general, it may be said that the temperature should in all cases preferably remain below that temperature at which substantial decomposition of the cupric oxide occurs. This will be evident from a consideration of the fact that a more porous catalytic mass is obtained from the reduction of cupric oxide than from cuprous oxide because one molecule of oxygen is lost in the former case, while only one-half of a molecule is lost in the latter case. Expressed in general terms, the temperature should be such as to bring about sintering of the copper oxide material, but not sufficient to cause actual fusion.

As indicated by the examples, we may employ percentages of metallic oxides other than copper oxide as supports or promoters. However, the presence of these oxides has no adverse effect upon the catalytic efficiency of the ultimate material and does not in any way interfere with the process of consolidating the oxide material. In fact, our process makes possible the production of promoted catalysts which are greatly superior to known mixed catalysts, such, for example, as those in which copper is coated with zinc oxide. Our catalysts function the same as alloys or as one component catalysts, so far as physical properties are concerned, but nevertheless act chemically the same as mixed catalysts.

It will thus be seen that we have provided an improved procedure for the preparation of copper catalysts of both the promoted and unpromoted types, and that these catalysts possess outstanding advantages over similar catalytic materials prepared in accordance with prior art procedures. For example, because we employ cupric oxide and largely, if not entirely, avoid decomposition of the cupric oxide to the cuprous form and, in any event, avoid melting of the metallic oxide material, we arrive at a final catalytic mass in which, in the ultimate use or upon reduction of the oxide material, more oxygen per molecule of copper oxide compound is removed than is the case in which copper oxide is decomposed either to cuprous oxide or to metallic copper and the cuprous oxide or the metal permitted to reach the actual fusion point. In other words, since the copper is kept in cupric condition to as great an extent as possible, there remains in the final product a much greater proportion of oxygen to be removed and this, in turn, gives the ultimate (reduced) catalytic mass a far greater porosity than would be possible when removing a less amount of oxygen. To express it in still another way, we keep the metal in open molecular condition to as great an extent as possible, consistent with obtaining maximum consolidation and physical strength.

Another outstanding feature of our invention is the fact that because of our procedure of consolidating the metal oxide particles under the influence of heavy pressure and a sintering temperature, substantially all particles of the ultimate catalytic material are permanently united in a strong, cohesive or autogenous bond which gives the material substantial physical strength and marked resistance to crumbling or dusting, both in handling and in use. This is of great importance, especially when the catalytic material is employed for the carrying out of vapor-phase reactions at high space velocity.

Further outstanding advantages of the catalytic material prepared in accordance with our invention are easy regeneration and long life. Because of the extreme porosity of the material the catalyst may be readily regenerated. Because of its ready regenerability and its substantial physical strength and absence of brittleness it has a much longer life than the relatively dense, brittle and non-porous copper catalysts of the prior art.

The hereindescribed process of producing these improved catalytic materials has the advantage of extreme simplicity, economy of operation, and avoidance of the necessity of handling molten material and the carrying out of awkward quenching operations.

To summarize the more important advantages provided by our invention it may be said that we have provided a process which is a simple, direct, economical and efficient process and produces a catalyst characterized by (a) maximum porosity; (b) maximum catalytic surface; (c) extremely high catalytic activity; (d) rugged physical structure and substantial freedom from crumbling or dusting; (e) exceptionally long life, and (f) ready regenerability, even after long periods of use.

What we claim is:

1. The process of preparing a porous, noncrystalline, copper catalyst which comprises subjecting cupric oxide particles to a pressure sufficient to cause the particles to form a compact, cohesive, self-sustaining mass, heating the mass to a temperature of 1000–1010° C. for a period of 2–2½ hours, raising the temperature to 1050–1060° C. for about ½ hour and thereafter subjecting the resulting cupric and cuprous oxide mixture to a pressure of 1500–2000 pounds per square inch.

2. The process of preparing a porous, noncrystalline, copper catalyst, which comprises subjecting cupric oxide particles to a pressure of approximately 1500 to 2000 pounds per square inch, whereby the particles form a compact, cohesive, self-sustaining mass, heating the mass to a temperature of about 1000–1010° C. for a period of 2–2½ hours, raising the temperature to about 1050–1060° C. for about a half hour, subjecting the resulting mixture of cupric and cuprous oxides to a pressure of approximately 1500–2000 pounds per square inch, cooling the compressed oxide mixture to a temperature of approximately 800° C. while still under the last named pressure, releasing the pressure on the mixture and permitting the mixture to cool to room temperature and thereafter reducing the copper oxide to metallic copper by passing an aliphatic alcohol thereover at a temperature in the vicinity of 235° to 330° C.

DAVID C. HULL.
JONATHAN FRED QUARLES.

REFERENCES CITED

The following references are of record in the file of this patent:

UNITED STATES PATENTS

| Number | Name | Date |
| --- | --- | --- |
| 1,400,204 | Backhaus | Dec. 13, 1921 |
| 1,937,728 | Storch | Dec. 5, 1933 |
| 2,106,597 | Ferguson | Jan. 25, 1938 |
| 2,129,844 | Kiefer | Sept. 13, 1938 |
| 2,133,761 | Tietig | Oct. 18, 1938 |
| 2,183,146 | Michael | Dec. 12, 1939 |
| 2,220,261 | Michael et al. | Nov. 5, 1940 |
| 2,273,573 | Hasche | Feb. 17, 1942 |
| 2,364,562 | Stowe | Dec. 5, 1944 |
| 2,380,997 | Patnode | Aug. 7, 1944 |

OTHER REFERENCES

Wulff, Powder Metallurgy published by American Society for Metals, Cleveland, Ohio, 1942, pages 155, 158, and 164.